United States Patent [19]

Torres et al.

[11] Patent Number: 5,550,969

[45] Date of Patent: Aug. 27, 1996

[54] GRAPHICAL METHOD OF INDICATING THE POSITION OF AND PERFORMING AN OPERATION ON A PLURALITY OF SELECTED OBJECTS IN A COMPUTER SYSTEM

[75] Inventors: Robert J. Torres, Colleyville, Tex.; Stephen S. Fleming, Boulder, Colo.

[73] Assignee: International Business Machines Corporation, Armonk, N.Y.

[21] Appl. No.: 180,514

[22] Filed: Jan. 12, 1994

Related U.S. Application Data

[63] Continuation of Ser. No. 619,628, Nov. 28, 1990, abandoned.

[51] Int. Cl.[6] .................................................. G06F 3/14
[52] U.S. Cl. ........................ 395/159; 395/157; 345/123
[58] Field of Search ................................. 395/159, 157, 395/156, 155; 345/123–125, 121, 119, 145

[56] References Cited

U.S. PATENT DOCUMENTS

| | | | |
|---|---|---|---|
| 4,862,390 | 8/1989 | Weiner | 395/155 |
| 5,014,222 | 5/1991 | Donahue | 395/155 |
| 5,040,131 | 8/1991 | Torres | 395/156 |
| 5,095,448 | 3/1992 | Obuchi et al. | 395/155 X |
| 5,214,756 | 5/1993 | Franklin et al. | 395/159 |
| 5,333,247 | 7/1994 | Gest et al. | 395/155 X |
| 5,339,391 | 8/1994 | Wroblewski et al. | 395/157 |
| 5,434,591 | 7/1995 | Goto et al. | 345/123 |

FOREIGN PATENT DOCUMENTS 0509160  10/1992  European Pat. Off. .

OTHER PUBLICATIONS

Microsoft Windows Write Version 2.0 User's Guide, Microsoft Corporation, 1987, pp. 61–66.
Microsoft Windows Write User's Guide, Version 2.0, 1987, pp. 15–19.
IBM Technical Disclosure Bulletin vol. 32, No. 4A 9/89 p. 182 "Method for Direct Manipulation".
Research Disclosure No. 312, 4/90, "Direct Manipulation Icon Pointer/Interaction for Multiple Selections".

*Primary Examiner*—Raymond J. Bayerl
*Attorney, Agent, or Firm*—Jonathan E. Jobe, Jr.; Andrew J. Dillon

[57] ABSTRACT

A method of indicating the position of multiple selections of objects in a windowed computer user interface. The method includes displaying objects to be selected in a window which includes a scroll bar. When objects in the window are selected, a marker icon is automatically placed in the scroll bar in response to such selection.

4 Claims, 6 Drawing Sheets

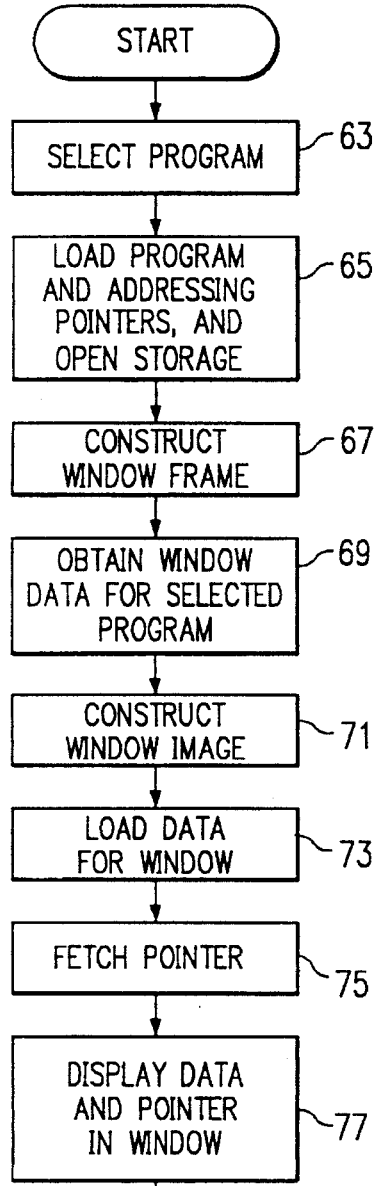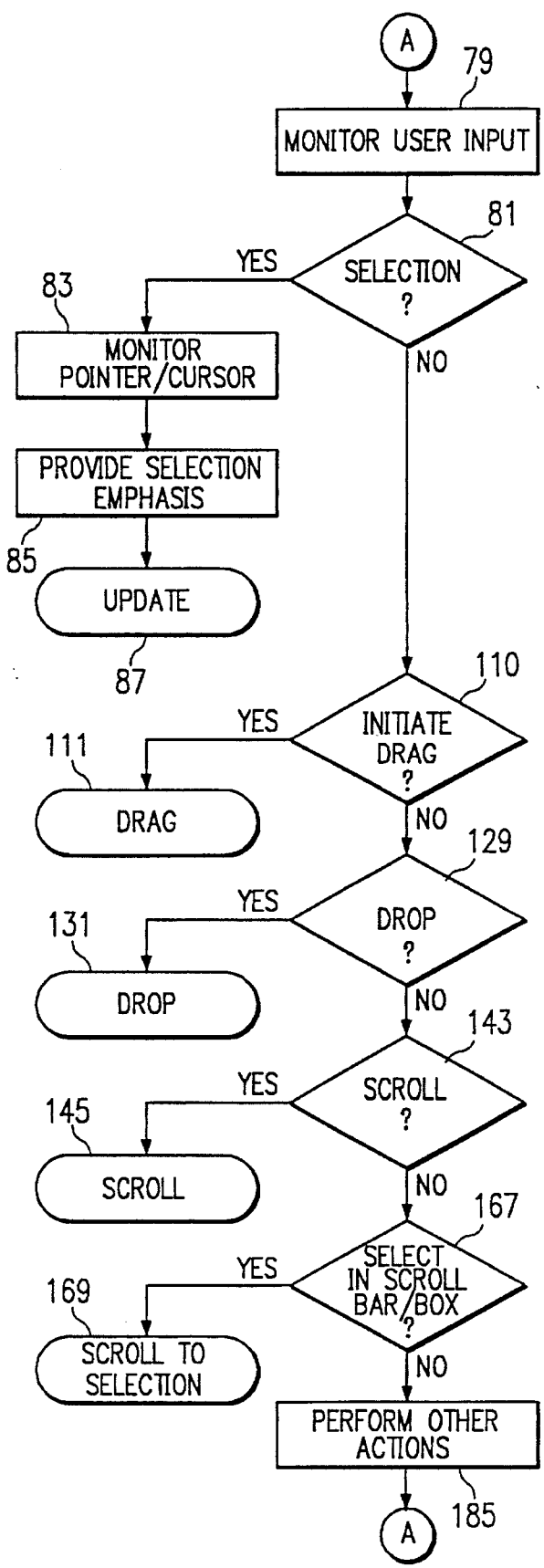

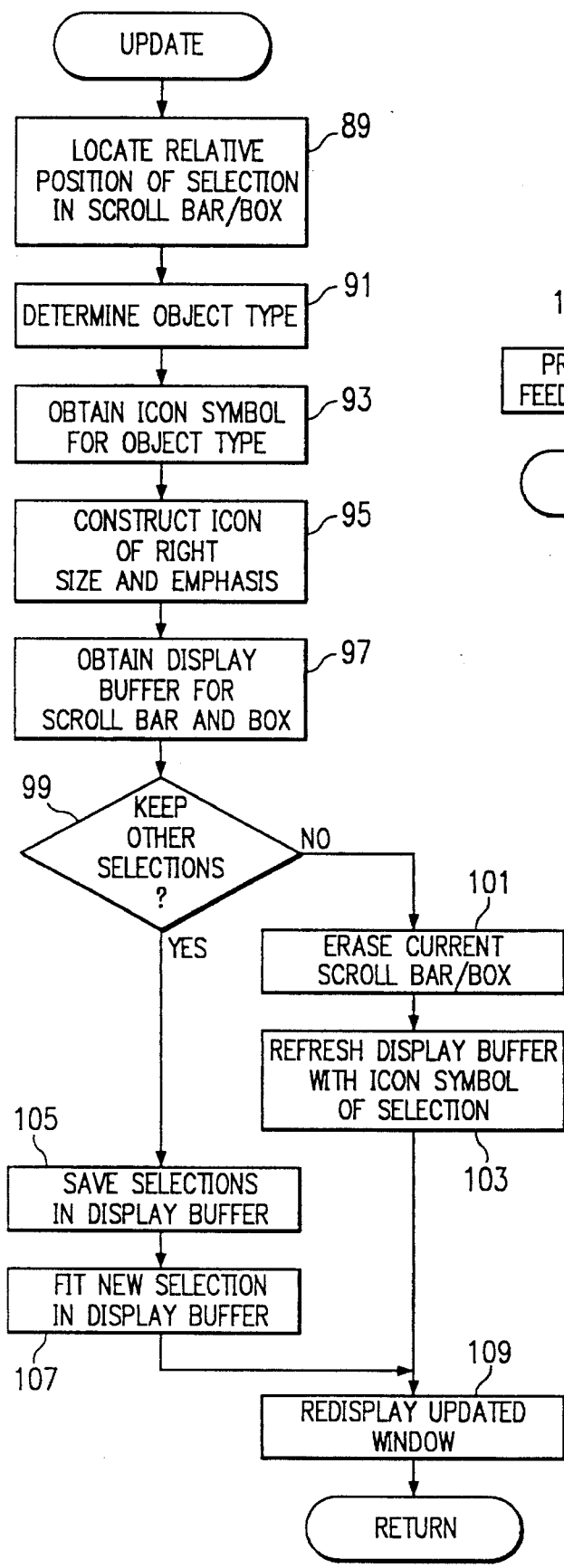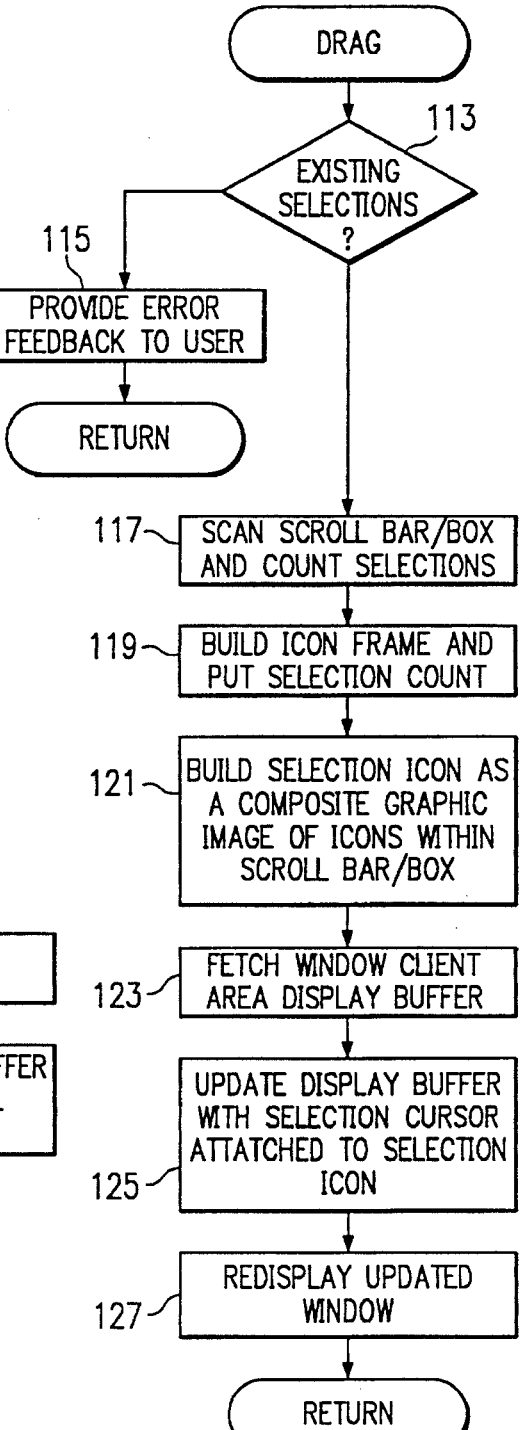

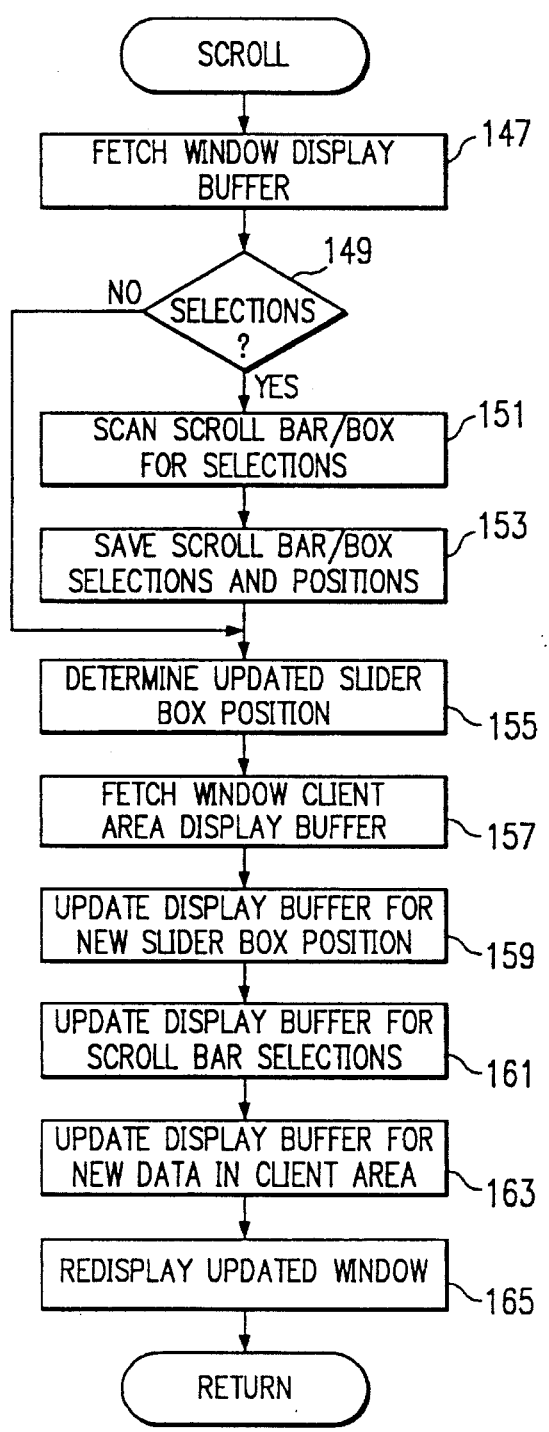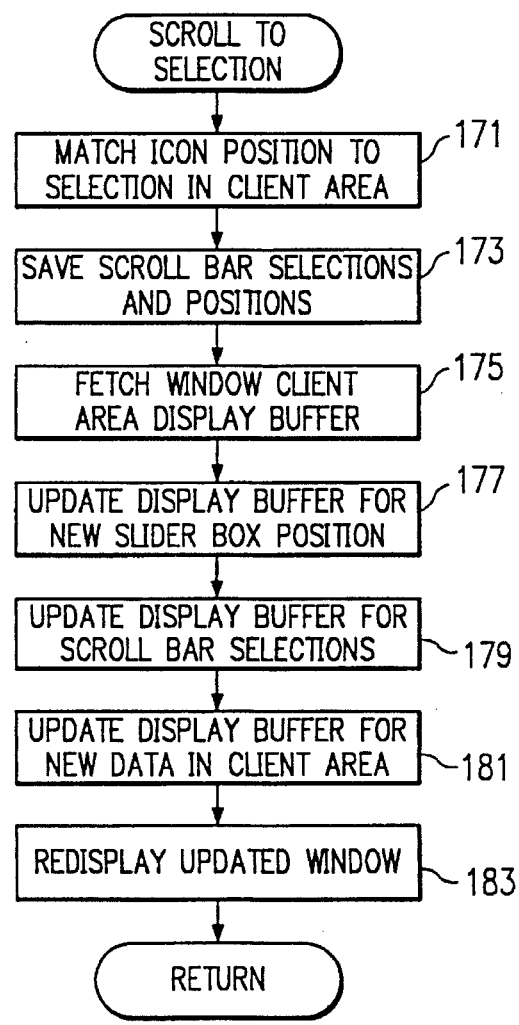

5,550,969

GRAPHICAL METHOD OF INDICATING THE POSITION OF AND PERFORMING AN OPERATION ON A PLURALITY OF SELECTED OBJECTS IN A COMPUTER SYSTEM

The application is a continuation of application Ser. No. 07/619,628, filed Nov. 28, 1990, now abandoned.

BACKGROUND OF THE INVENTION

1. Field of the Invention

The present invention relates generally to windowed computer user interfaces, and more particularly to a graphical interface that supports direct manipulation of objects.

2. Description of the Prior Art

In windowed computer user interfaces, the user may select objects to act upon. Selection is the act of marking a choice. The user may select 0, 1, or more objects. A user may also scroll the window, causing items to appear and disappear from direct view. During scrolling, a user's selection may no longer be immediately visible. Subsequent actions can affect selections, even though the selected objects are not visible.

If a user selects more than one object, it may not be possible to see all selections simultaneously. For example, in a large list of items it may not be possible to view simultaneously the first and last item of the list. Thus, if these two items are selected, it will not be possible to view both selections at once. Here the user is forced to remember what the other selections are, since they cannot be all viewed at the same time.

A typical user task involves scrolling information and selecting a number of objects or, items on which to perform an action. For example, the user may scroll a list of mail received and select individual mail items to print. Conventional user interface designs allow direct manipulation of a selected item to be interpreted as manipulating all selected items. Unfortunately, when scrolling to the end of a large list, unless the user has selected one of the items at the very end of the list to print, current systems require the user to scroll back to a selected item before direct manipulation can be used to print the selected items.

Also, in current implementations, the user does not know where the selected objects are when they have been scrolled out of sight. In order to review the selections the user must scroll slowly through the data until he or she finds the selected objects.

SUMMARY OF THE INVENTION

In the present invention, a scroll bar is positioned in the window for an application. When the user selects an object in the window, a marker icon is automatically placed in the scroll bar in response to the selection. As the user scrolls the window through the data and makes additional selections, a marker icon is placed in the scroll bar to indicate the position of each additional selection. The scroll bar includes a slider box that indicates where in the data the window is positioned. The user can thus know where the selections are with respect to the current window view and can immediately view individual selections by clicking the mouse or similar pointing device on each marker. Alternately, the user may drag the slider box to the marker to view the given selection. If the user deselects an object, the marker icon for the object is deleted.

In the present invention, the user can perform an action on the selected objects by direct manipulation. The user does so by dragging a marker icon out of the scroll bar to a target object. In the preferred embodiment, when the user drags the marker out of the scroll bar, the system automatically displays a selection collection icon that represents the selected objects.

BRIEF DESCRIPTION OF THE DRAWINGS

FIG. 6 is a flowchart of the initialization routine of the present invention.

FIG. 7 is a flowchart of a preferred software implementation of the present invention.

FIG. 8 is a flowchart showing details of the "UPDATE" routine of FIG. 7.

FIG. 9 is a flowchart showing details of the "DRAG" routine of FIG. 7.

FIG. 11 is a flowchart showing an implementation of the "SCROLL" routine of FIG. 7.

FIG. 12 is a flowchart showing an implementation of the "SCROLL TO SELECTION" routine of FIG. 7.

DESCRIPTION OF THE PREFERRED EMBODIMENT

Figure 1:
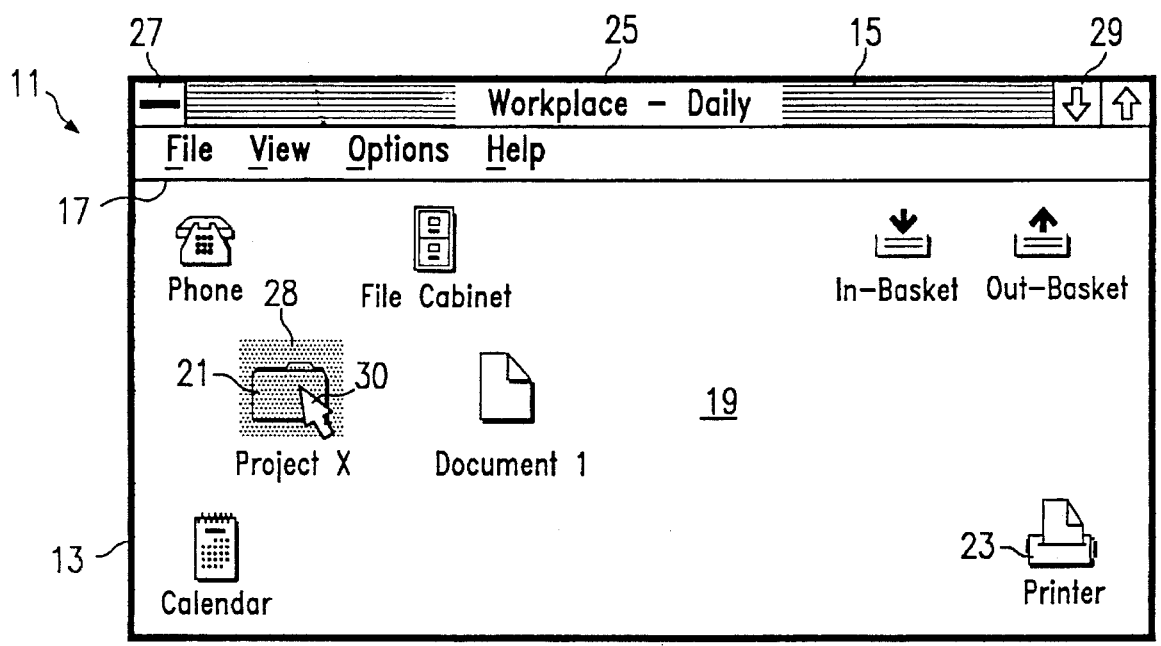
FIG. 1 is a pictorial view of a window entitled "Workplace-Daily".

Referring now to the drawings, and first to FIG. 1, a window is designated generally by the numeral 11. Window 11 includes a border or frame 13 that forms the outer boundary of the window. Contained within border 13 are a title bar 15 and an action bar 17. The remainder of window 11 consists of a client area 19 which is populated with a plurality of icons, including a folder icon 21, which is labeled "Project X" and a printer icon 23.

Title bar 15 includes a window title 25, which identifies the window, a system menu icon 27, and window sizing icons 29. System menu icon 27 allows the user to display a pull-down menu containing actions that the user can perform on the window such actions are related to the window itself and not to the object that is displayed in the window. For example, actions include MOVE, which allows the user to reposition the window on the screen, MINIMIZE, which reduces the size of the window, and MAXIMIZE, which enlarges the window to the size of the screen. Window-sizing icons 29 provide a fast way to use a mouse or pointing device to perform the actions of MINIMIZE and MAXIMIZE without requiring a menu.

Action bar 17 contains a list of actions of the applications shown in the window. Each action in the list in action bar 17 has an associated pull-down menu that lists the individual actions that are contained within each general action listed in action bar 17. For example, the FILE pull-down enables the user to work with files through actions that manipulate the file as a whole. The individual actions contained within the FILE action include NEW, which allows users to create a new file, and SAVE, which writes the existing file to a storage device.

A pointer 30 is movable by the user by means of a mouse (not shown). The user can move pointer 30 about the screen and, by means of the mouse buttons, select objects, open windows, directly manipulate objects, and perform other operations. In FIG. 1, folder 21 is shown emphasized highlighted by means of a grey box 28. The emphasis indicates that folder 21 has been selected. The selection is made by positioning pointer 30 on folder 21 and clicking mouse button number one. The selected object is available for action.

Figure 2:
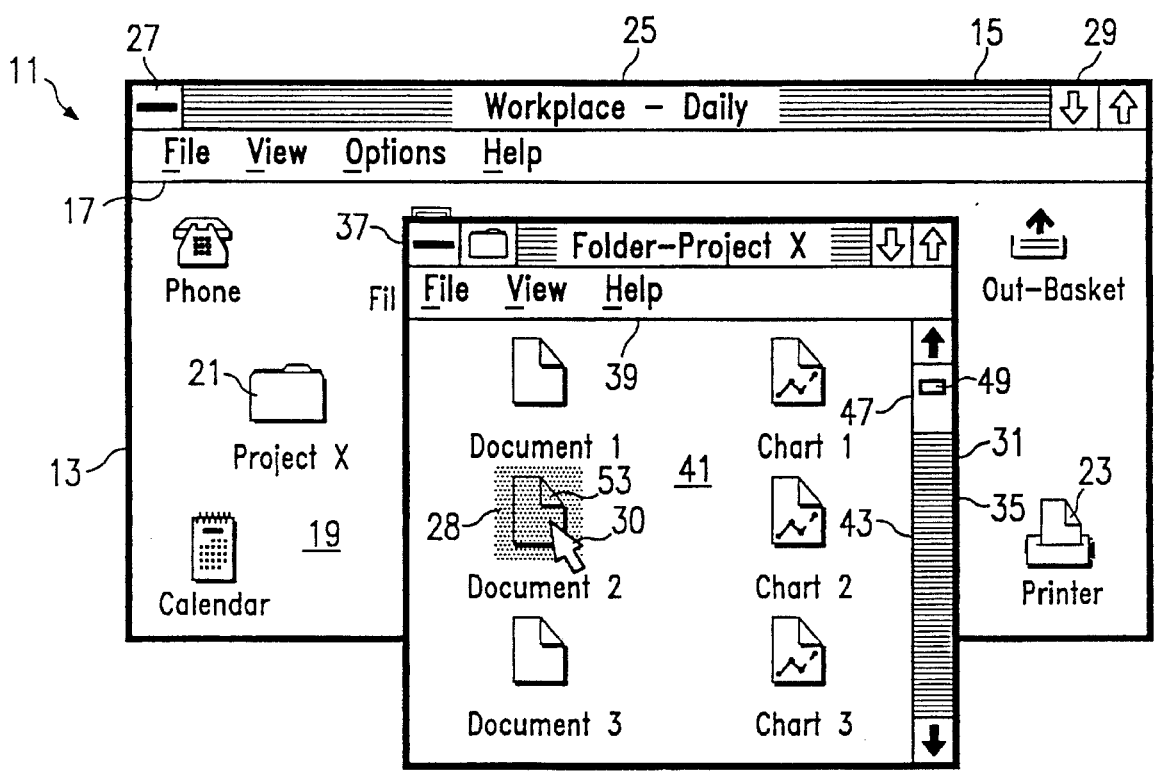
FIG. 2 is a pictorial view similar to FIG. 1 in which a window entitled "Folder-Project X" has been opened and the object entitled "Document 2" has been selected.

Turning now to FIG. 2, there is shown in addition to window 11, an object window 31. Object window 31 contains the contents of the "Project X" folder represented by icon 21. Window 31 was opened by choosing the "Open" option from the pull-down menu associated with the "File" action of action bar 17. Window 31 could also have been opened by placing pointer 30 on folder 21 and double clicking mouse button number one.

Window 31 is similar to window 11 in that it includes a frame 35, a title bar 37, an action bar 39, and a client area 41 that is populated with a plurality of document and chart icons. Window 31 also includes a scroll bar 43, which allow the user, in effect, to move window frame 35 to view the contents of the object within client area 41. Scroll bar 43 contains a slider box 47, which represents the position and size of the visible information in relation to all the information that is available. For example, if slider box 47 is one-third of the way down from the top of scroll bar 43, the portion of information the user sees is one-third of the way down from the top of the information.

As indicated by emphasis box 28, "Document 2" icon 53 has been selected. Document icon 53 was selected by placing pointer 30 thereon and clicking mouse button number one. When icon 53 was selected, a marker icon 49 was placed automatically in scroll bar 43 inside slider box 47. Marker icon 49 indicates that a selection has been made near the top of the data.

Figure 3:
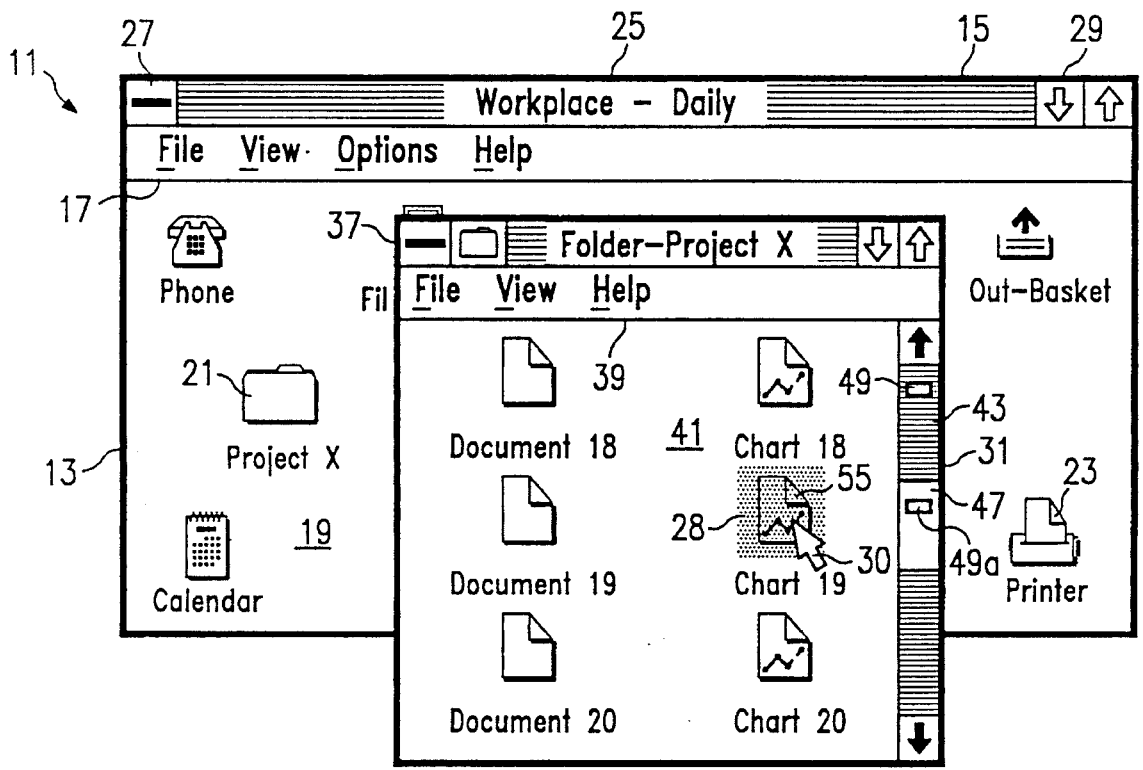
FIG. 3 is a pictorial view similar to FIG. 2 in which the "Folder-Project X" window has been scrolled and the object entitled "Chart 19" has been selected.

Referring now to FIG. 3, window 31 has been scrolled to make visible additional items in client area 41. Slider box 47 indicates that window 31 has been scrolled to a position approximately midway between its top and bottom. Emphasis box 28 indicates that the icon 55 for the object entitled "chart 19" has been selected. Again, a marker icon 49a has been placed in scroll bar 43 within slider box 47 to indicate the selection of icon 55. Marker icon 49 remains visible. Thus, the user can tell at a glance that two selections have been made and their positions in the data.

Figure 4:
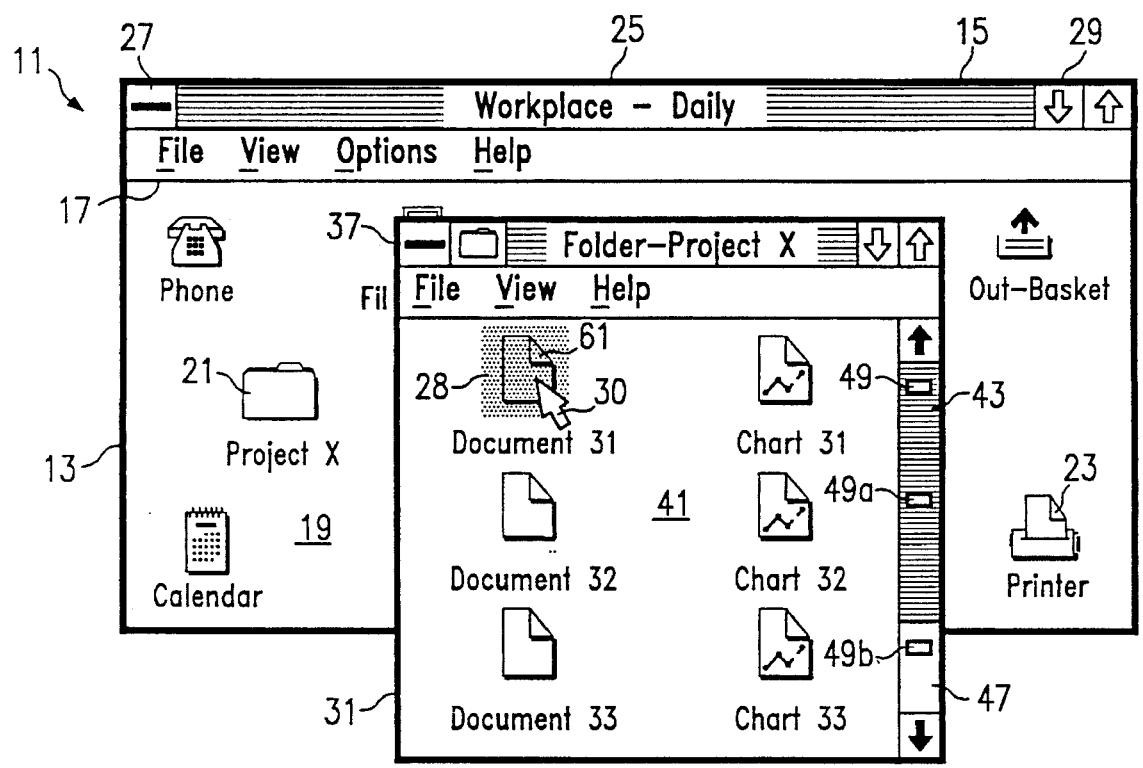
FIG. 4 is a pictorial view similar to FIG. 3 in which the "Folder-Project X" window has been been scrolled and the object entitled "Document 31" has been selected.

Referring to FIG. 4, window 31 has been scrolled to the bottom of the data. An additional selection has been made, as indicated by the emphasis box 28 on document icon 61. As in the previous examples, the selection of icon 61 is also indicated by marker icon 49b, which has been displayed in scroll bar 43 within slider box 47. The user thus knows that three selections have been made and he or she can review the selections by moving pointer 30 to one of the markers and clicking mouse button number one, which will scroll the window 31 to view the selected object.

Figure 5:
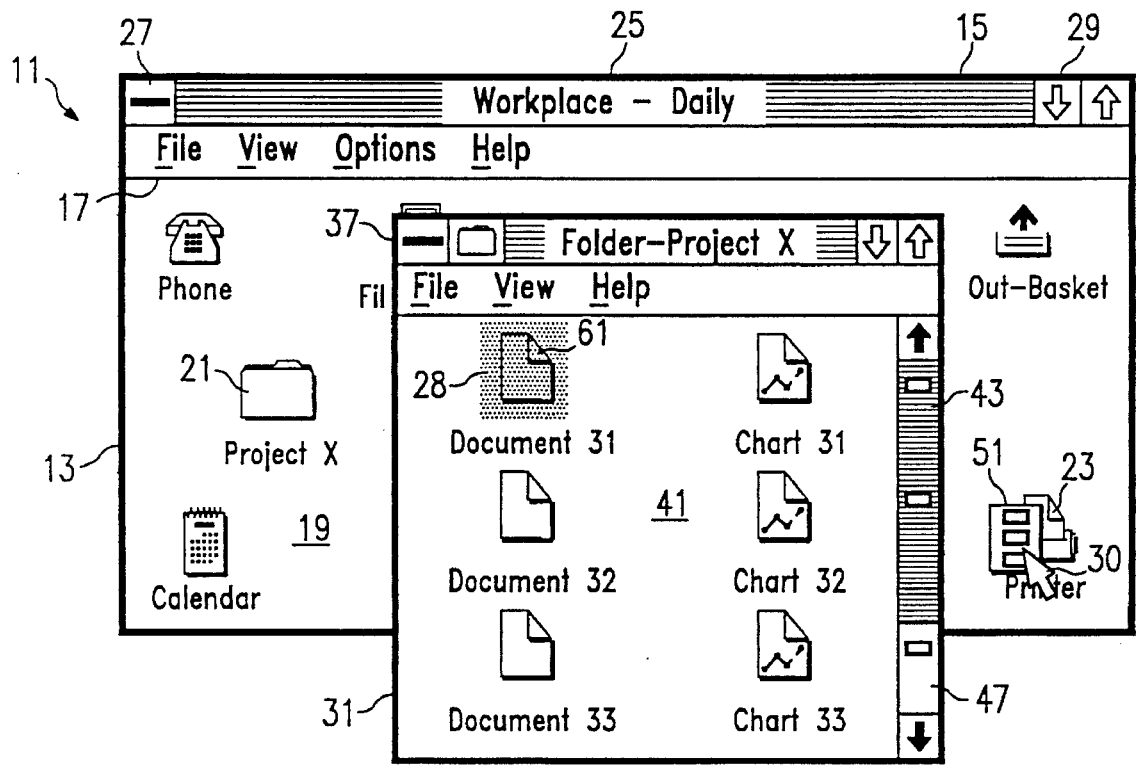
FIG. 5 is a pictorial view similar to FIG. 4 showing direct manipulation of the selection collection object icon.

FIG. 5 depicts the direct manipulation of a selection collection object icon 51 to print the selected objects. Selection collection object icon 51 is created by moving printer to one of the markers and holding down mouse button number two while dragging the marker out of scroll bar 47. When the marker is dragged out of scroll bar 47, icon 51 is displayed on the screen. Selection collection object icon 51 is directly manipulated by dragging it to printer icon 23. When selection collection object icon 51 is dropped on printer icon 23, the selected documents and charts will be printed.

Turning now to FIGS. 6–12, there is shown flowcharts of a preferred software implementation of the present invention. Referring first to FIG. 6, a program is selected at block 63. Upon selection, the program and addressing pointers are loaded; and storage is opened at block 65. Then, in block 67, the window frame is constructed. After the window frame has been constructed, the window data for the selected program is obtained at block 69 and the window image is constructed at block 71. Then, the data for the window is loaded at block 73, the mouse pointer is fetched at block 75, and the data and the mouse pointer are displayed in the window at block 77.

Referring now to FIG. 7, after the window has been constructed and the data is displayed therein, the input is monitored at block 79. As shown at decision block 81, if the user makes a selection, the system monitors the pointer or cursor at block 83 and provides selection emphasis at block 85. Referring for example to FIG. 5, selection emphasis consists of putting a grey box 28 over the selected object. Then, referring again to FIG. 7, the system performs UPDATE, which is generally indicated at block 87.

Referring particularly to FIG. 8, which shows details of a preferred implementation of the UPDATE routine of the present invention, the relative position of the selection is located in the scroll bar or slider box at block 89. Then, at block 91, the type of object selected is determined and, at block 93, an icon symbol for that object type is obtained. Then, an icon of the appropriate size and emphasis is constructed at block 95 and the display buffer for the scroll bar and slider box is obtained at block 97. The system tests at decision block 99 whether there are other selections to keep; if there are not, the current scroll bar and slider box is erased at block 101 and the display buffer is refreshed with the icon symbol of the selection at block 103. If there are other selections, the selections are saved in the display buffer at block 105, and the new selection is fit into the display buffer at block 107. Then, the updated window is re-displayed at block 109 and the system returns to block 79 of FIG. 7 and continues to monitor the input.

Referring again to FIG. 7, if, at decision block 110, the user desires to initiate a DRAG of the selected objects as a group, as shown in and described with respect to FIG. 5, the system performs the drag routine, which is indicated generally at 111. Referring particularly to FIG. 9, in the DRAG routine the system tests at decision block 113 whether or not there are existing selections; if not, error feedback is provided to the user at block 115 and the system returns to block 79 and continues to monitor user input. If there are existing selections, then the scroll bar and slider box are scanned and the selections are counted at block 117. Then an icon frame is built at block 119 and a selection icon, which is a composite graphic image of the icons within the scroll bar and slider box, is built at block 121. Then, the window client area display buffer is fetched at block 123 and updated with the selection cursor attached to the selection icon in block 125. Then, the updated window is re-displayed at block 127 and the system returns to continue monitoring input at block 79.

Figure 10:
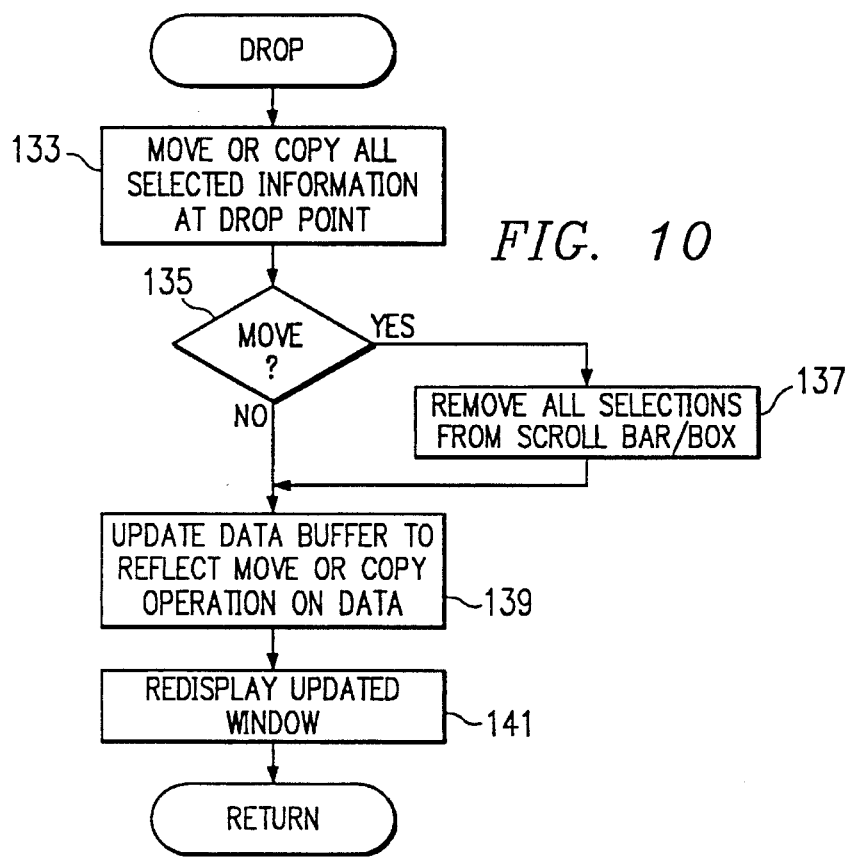
FIG. 10 is a flowchart showing an implementation of the "DROP" routine of FIG. 7.

Referring again to FIG. 7, if at decision block 129, the user drops the selection icon, then the system performs the DROP routine which is generally indicated at 131. A preferred software implementation of the DROP routine is shown in FIG. 10. As shown at block 133, all selected information is moved or copied at the drop point. The system tests at block 135 whether the action is a MOVE. If it is, all selections are removed from the scroll bar or slider box at block 137. Then the data buffer is updated at block 139 to reflect the MOVE or COPY operation on the data and the updated window is re-displayed at block 141. Then, the system returns to block 79 and continues to monitor user input.

Referring again to FIG. 7, if, at decision block 143, the user scrolls the window, the system performs the SCROLL routine which is indicated generally at 145 and shown in detail in FIG. 11. First, the window display buffer is fetched at block 147. The system tests at decision block 149 whether or not there are any selections. If there are, the scroll bar and slider box are scanned for selections at block 151 and the scroll bar/slider box selections and positions are saved at block 153. Next, the updated slider box position is determined at block 155. The window client area display buffer is fetched at block 157 and the display buffer is updated for the new slider box position at block 159. Also, the display buffer is updated for the new scroll bar selections at block 161 and the display buffer is updated for the new data in the client area at block 163. Then, the updated window is re-displayed at block 165 and the system returns to block 79 of FIG. 7 and continues to monitor user input.

The present invention allows the user to review the selections made by pointing to the selection marker icons in the scroll bar or slider box and scrolling to them by clicking mouse button number one thereon. If, at decision block 167, the user makes a selection in the scroll bar or slider box, the system performs the SCROLL TO SELECTION routine indicated generally at 169 and shown in detail in FIG. 12. Referring to FIG. 12, the marker icon position is matched to the selection in the client area at block 171 and the scroll bar selections and positions are saved at block 173. Then, the window client area display buffer is fetched at block 175. After the window client area display buffer has been fetched, the display buffer is updated for the new slider box position at block 177, the display buffer is updated for the scroll bar selections at block 179, and the display buffer is updated for new data in the client area at block 181. Then, the updated window is re-displayed at block 183 and the system returns to block 79 of FIG. 7 to continue monitoring user input. As shown generally at block 185 of FIG. 7, other actions may be performed.

The present invention allows the user to see at a glance how many selections have been made and to review those selections quickly and easily. The present invention also allows the user to perform operations on the selections as a group by direct manipulation.

While the invention has been particularly shown and described with reference to a preferred embodiment, those skilled in the art will understand that various changes may be made in form and detail without departing from the spirit and scope of the invention.

What is claimed is:

1. A method for enhanced efficiency in the manipulation of objects within a computer system which includes a display screen for displaying a display window, user operable means for manipulating objects on said display screen, a scroll bar associated with said display window for indicating an available display area which exceeds said display window in size and a position indicator within said scroll bar for graphically indicating a relative position within said available display area of a portion of said available display area which is visible within said display window, said method comprising the computer implemented steps of:

displaying objects to be selected within said display window;

automatically placing a first marker icon in said scroll bar in response to selection of a first object within said display window;

simultaneously displaying said first marker icon and said position indicator within said scroll bar wherein a relative position of said first object within said available display area may be graphically depicted: and performing an action on said first object in response to dragging of said marker icon to a target object.

2. The method according to claim 1, further including the step of automatically displaying a selection collection icon within said display screen in response to dragging said first marker icon.

3. A system for enhanced efficiency in the manipulation of objects within a computer system which includes a display screen for displaying a display window, user operable means for manipulating objects on said display screen, a scroll bar associated with said display window for indicating an available display area which exceeds said display window in size and a position indicator within said scroll bar for graphically indicating a relative position within said available display area of a portion of said available display area which is visible within said display window, said system comprising:

means for displaying objects to be selected within said display window;

means for automatically placing a first marker icon in said scroll bar in response to selection of a first object within said display window;

means for simultaneously displaying said first marker icon and said position indicator within said scroll bar wherein a relative position of said first object within said available display area may be graphically depicted; and means for performing an action on said first object in response to dragging of said marker icon to a target object.

4. The system according to claim 3 further including means for automatically displaying a selection collection icon within said display screen in response to dragging said first marker icon.

* * * * *